(12) United States Patent  (10) Patent No.: US 8,264,130 B2
Szabo et al.  (45) Date of Patent: Sep. 11, 2012

(54) SAFETY PROTECTION SOLUTION FOR COMPACT FLUORESCENT LAMPS

(75) Inventors: Attila Szabo, Lewis Center, OH (US); Norbert Benko, Budapest (HU); Gabor Schmidt, Budapest (HU)

(73) Assignee: General Electric Company, Schenectady, NY (US)

( * ) Notice: Subject to any disclaimer, the term of this patent is extended or adjusted under 35 U.S.C. 154(b) by 164 days.

(21) Appl. No.: 12/787,817

(22) Filed: May 26, 2010

(65) Prior Publication Data

US 2011/0291563 A1    Dec. 1, 2011

(51) Int. Cl.
*H01J 1/02* (2006.01)
(52) U.S. Cl. .......................................... 313/17; 313/634
(58) Field of Classification Search .................. 313/110, 313/112, 489, 17, 485–487, 635; 362/224–225
See application file for complete search history.

(56) References Cited

U.S. PATENT DOCUMENTS

| 4,527,089 | A | 7/1985 | Bouchard et al. |
| 5,691,598 | A | 11/1997 | Belle et al. |
| 6,064,155 | A | 5/2000 | Maya et al. |
| D581,580 | S | 11/2008 | Townsley |
| 2003/0001112 | A1* | 1/2003 | Hollander ................. 250/504 R |
| 2008/0278095 | A1* | 11/2008 | Wursching et al. ........... 315/291 |

FOREIGN PATENT DOCUMENTS

GB    EP0238200 A2 * 9/1987

* cited by examiner

*Primary Examiner* — Anne Hines
(74) *Attorney, Agent, or Firm* — Fay Sharpe LLP

(57) ABSTRACT

A compact fluorescent lamp which includes a compact fluorescent light source and a ballast operatively connected to and controlling operation of the light source. An outer light transmissive envelope surrounds the light source and an elastic protective shield surrounds the ballast.

20 Claims, 2 Drawing Sheets

SAFETY PROTECTION SOLUTION FOR COMPACT FLUORESCENT LAMPS

BACKGROUND OF THE DISCLOSURE

The present disclosure relates to a lamp assembly, and more particularly to a compact fluorescent lamp (CFL) assembly of the type having an outer envelope or bulb and a ballast circuit within the outer envelope. Even more specifically, the present disclosure relates to CFLs that include an elastic protective shield surrounding the ballast circuit within the outer envelope. It is to be appreciated, though, that the present disclosure is also amenable to other like applications.

Many commercially available low-pressure discharge lamps are so-called compact fluorescent lamps (CFL). These lamps are intended to replace incandescent lamps used in a wide field of industry and home applications. The main advantages of these lamps are low-power consumption and a long lifetime. Disadvantageous is the potential of electric shocks to the consumer when handling broken CFL lamps.

Accordingly, there is a need for an electric lamp, in particular a compact fluorescent lamp, with an outer envelope and a ballast circuit within the outer envelope with a safe solution for the prevention of electric shocks when the compact fluorescent lamp enclosure (plastic or glass) is compromised.

SUMMARY OF THE DISCLOSURE

In one aspect, the present disclosure relates to a compact fluorescent lamp (CFL) that includes a compact fluorescent light source and a ballast operatively connected to and controlling operation of the light source. The lamp further includes an outer light transmissive envelope surrounding the light source and an elastic protective shield surrounding the ballast.

In another aspect, the present disclosure relates to a method of forming a compact fluorescent lamp assembly which includes providing a compact fluorescent light source, a ballast for operating the light source, an outer envelope for enclosing the light source and at least a portion of the ballast. The method further includes providing an elastic shield surrounding the ballast.

A primary benefit of the present disclosure is the prevention of electric shocks when accessing broken compact fluorescent lamps.

Another benefit of the present disclosure is a decrease the thickness of the glass wall of the outer envelope or bulb without a corresponding decrease in lamp performance.

Still another benefit of the present disclosure resides in the lower cost of manufacture as a result of the decrease in the glass envelope.

Yet another benefit is associated with the elastic property of the protective shield which offers additional stability to the lamp against mechanical vibrations.

Still further advantages will become apparent to those of ordinary skill in the art upon reading and understanding the following detailed description of the preferred embodiment.

DETAILED DESCRIPTION OF THE PREFERRED EMBODIMENTS

Figure 1:
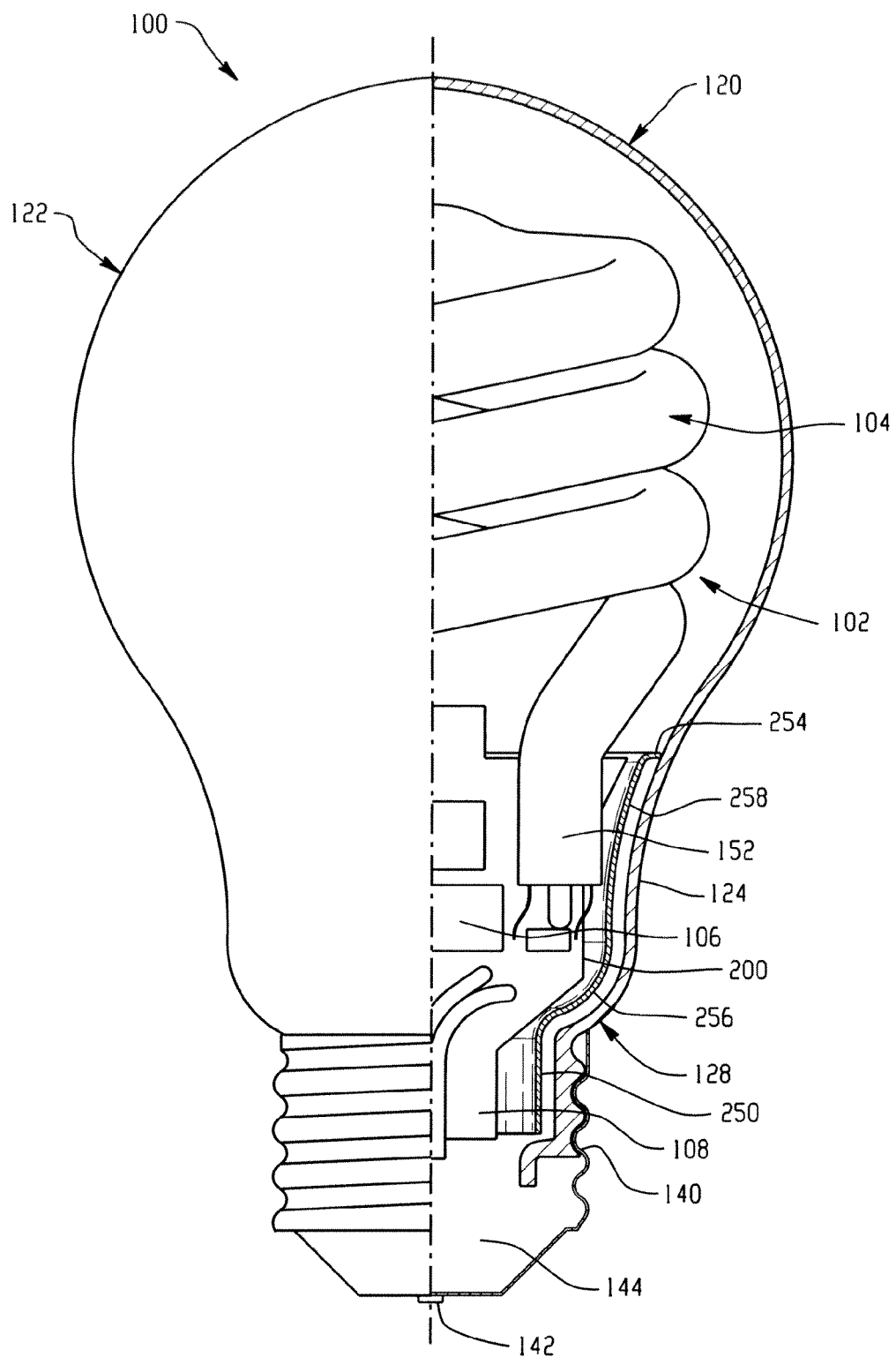
FIG. 1 is an elevational view, partly in cross-section, of a lamp assembly that includes an outer envelope and a ballast circuit within the outer envelope illustrating a protective shield surrounding the ballast circuit according to an exemplary embodiment of the present disclosure.

Shown in FIG. 1 is a lamp assembly 100 that includes an inner assembly 102 having a light source 104 and electronics member or printed circuit board, often referred to as a ballast circuit 106. The ballast circuit 106 is oftentimes incorporated into a lamp housing or support member 108 that supports the ballast circuit, the light source, and provides mechanical and electrical connection of the various lamp components. Enclosing the inner assembly is an outer envelope or bulb 120 which is preferably a light transmissive material, such as glass, that encloses an inner cavity dimensioned to receive the inner assembly therein. More particularly, the outer envelope adopts the general conformation of an A-line lamp having an enlarged generally spherical first portion 122 surrounding the light source 104 at one end and transitioning into a reduced dimensioned neck 124 at the other end interconnected with the spherical portion 122 through a tapered region. The outer envelope typically has a generally constant wall thickness that terminates in an opening at a first end 128 disposed adjacent a conventional electrically conductive base 138, shown here as a threaded Edison base or shell 140. The threaded shell 140 is separated from an end contact 142 by an insulating material 144. The base 138, and particularly the contact 142 and threaded region 140 thereof, are received in an associated lamp socket (not shown) to establish electrical and mechanical connection of the lamp assembly. Of course, other lamp bases such as conventional plug-in type connections that establish mechanical and electrical connection between the lamp assembly and an associated electrical socket can be used without departing from the scope and intent of the present disclosure.

The light source 104 is a compact fluorescent lamp (CFL) (shown here as a spiral CFL) that includes first and second ends or legs 152, 154 (not shown) that extend generally parallel to one another and in a longitudinal direction that is generally parallel to a central lamp axis of the lamp assembly 100. These legs receive electrodes at opposite ends of an elongated discharge path that includes each leg and an intermediate discharge path which in this embodiment is the helical or spiral lamp arrangement.

Figure 2:
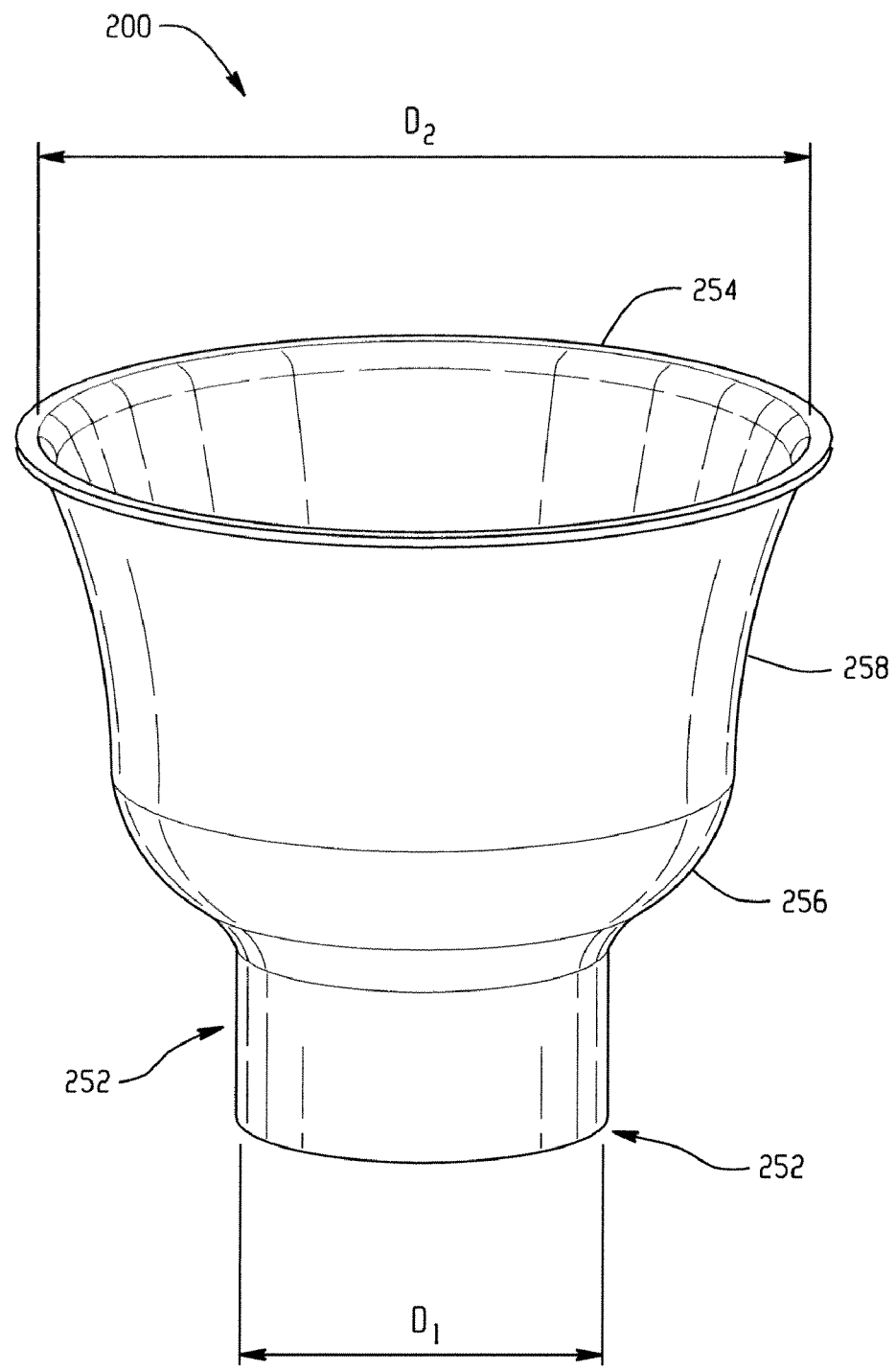
FIG. 2 is a perspective view of a protective shield according to an exemplary embodiment of the present disclosure.

The light source 104 and the ballast circuit 106 are held within the outer envelope 120 and relative to each other by the support 108 and further by an elastic protective shield 200. The elastic protective shield 200 prevents electric shocks and adds protection against mechanical vibrations. The elastic protective shield 200 is dimensioned to surround at least a portion of the light source 104 and preferably surrounds an interconnection of the ballast circuit 106 with the light source. As further illustrated in FIG. 2, the elastic protective shield 200 has a contour that substantially conforms to a contour of the outer envelope 120. Particularly, the shield has an open first or lower end 252 having a diameter $D_1$ that accommodates a lower portion of the printed circuit board/support 108. An outer surface of the first end is dimensioned for receipt in the Edison base, although as exemplified in FIG. 2, the shield need not extend along the full length of the base 138. Rather, the shield first end 252 substantially covers the printed circuit board 108. The opening 252 is dimensioned at $D_1$ to receive electrical leads (unnumbered) that extend from mechanical and electrical connection with the shell 140 and contact 142, and also mechanically and electrically connect with the printed circuit board/ballast circuit. The elastic protective shield 200 extends in surrounding relation over at least terminal ends portions of the first and second legs 152, 154 (not shown). The base 138 is configured to receive a terminal end of the outer envelope 120 and the elastic protective shield 200 has a first portion 250 surrounding the ballast circuit 106 and is received within the base 138. In an exemplary embodiment, the elastic protective shield 200 has a contour that substantially conforms to a contour of the envelope 120.

The elastic protective shield 200 has a transition portion 256 that expands radially outwardly in substantially the same contour as the envelope in this region of the lamp. The transition portion 256 of the shield interconnects the narrower first end with a sidewall 258. The sidewall 258 in turn extends along the neck 124 and thus the shield continues to be interposed between the glass of the outer envelope (which can potentially break) and the ballast. The sidewall 258 also steadily increases in dimension as the sidewall terminates at an open upper end 254 that extends to or beyond a height of the ballast. Preferably, the upper end 254 has a radial lip that extends outwardly into abutting engagement with an inner surface of the outer envelope 120 along the interface between the generally spherical portion 122 and the neck 124. The second end 254 has an open diameter $D_2$ that is substantially greater than the opening $D_1$ at the first end and is dimensioned to accommodate the ballast 106 and associated support 108 therein, as well as the legs 152 of the CFL.

The elastic protective shield 200 is formed from an electrically insulating material. In an exemplary embodiment, the elastic protective shield 200 is a silicone or other electrically insulating material. Silicone is desired because of the elastic nature of the material and the thermal stability of the material over a wide range of temperatures that may be encountered with a lamp. Incorporation of the generally annular, elastic, electrically insulating, protective shield 200 that is radially interposed between (i) the CFL legs and the outer envelope (ii) the ballast and the outer envelope, and (iii) the electrical/mechanical connection of the leads, ballast, and CFL legs, and the outer envelope. In this manner, consumers obtain additional protection from possible electrical shock if the outer envelope is inadvertently broken. Likewise, the glass wall (outer envelope) thickness may be minimized since the protection shield adds further mechanical protection.

The disclosure has been described with reference to the preferred embodiments. Obviously, modifications and alterations will occur to others upon reading and understanding the preceding detailed description. It is intended that the disclosure be construed as including all such modifications and alterations.

What is claimed is:

1. A compact fluorescent lamp assembly comprising:
a compact fluorescent light source;
a ballast operatively connected to and controlling operation of the light source;
an outer light transmissive envelope surrounding the light source; and
an elastic protective shield interposed between the ballast and the outer envelope.

2. The lamp assembly of claim 1 wherein the elastic protective shield is dimensioned to surround at least a portion of the light source.

3. The lamp assembly of claim 2 wherein the elastic protective shield surrounds an interconnection of the ballast with the light source.

4. The lamp assembly of claim 3 wherein the light source includes first and second legs having cathodes therein and the elastic protective shield extends in surrounding relation over at least terminal end portions of the first and second legs.

5. The lamp assembly of claim 1 further comprising a base that receives a terminal end of the envelope therein and wherein the elastic protective shield has a first portion surrounding the ballast and received within the base.

6. The lamp assembly of claim 5 wherein the elastic protective shield has a contour that substantially conforms to a contour of the envelope.

7. The lamp assembly of claim 1 wherein the elastic protective shield is formed from an electrically insulating material.

8. The lamp assembly of claim 1 wherein the elastic protective shield is formed from a silicone.

9. The lamp assembly of claim 1 wherein the elastic protective shield has a contour that substantially conforms to a contour of the envelope.

10. The lamp assembly of claim 1 wherein the elastic protective shield has a general cup-shape in which a base wall portion has a small opening that receives electrical leads therethrough for connection with the ballast, a sidewall that encloses a perimeter of the ballast, and an open end that extends beyond a height of the ballast.

11. A compact fluorescent lamp assembly comprising:
a compact fluorescent light source;
a ballast operatively connected to and controlling operation of the light source;
an outer light transmissive envelope surrounding the light source; and
an elastic protective shield having a contour that substantially conforms to a contour of the outer envelope, and wherein the elastic protective shield has an open first end having a diameter D1 and an open second end having a diameter D2 that is greater than D1.

12. A method of forming a compact fluorescent lamp assembly comprising:
providing a compact fluorescent light source and a ballast for operating the light source;
providing an outer envelope for enclosing the light source and at least a portion of the ballast; and
providing an elastic shield that surrounds the ballast between the ballast and that portion of the outer envelope enclosing the ballast.

13. The method of claim 12 wherein the elastic shield providing step includes forming the elastic shield from an electrically insulative material.

14. The method of claim 12 wherein the elastic shield providing step includes forming the elastic shield from a silicone.

15. The method of claim 12 wherein the elastic shield providing step includes contouring the elastic shield to conform to a contour of the outer envelope.

16. The method of claim 15 wherein the outer envelope providing step includes forming the outer envelope to have a generally spherical first portion that surrounds the light source and transitions into a reduced dimensioned neck that at least partially encloses the ballast.

17. The method of claim 16 wherein the elastic shield providing step includes dimensioning the elastic shield for receipt in the neck.

18. The method of claim 16 wherein the elastic shield providing step includes forming the shield into a generally cup-shaped member having a base with an opening for closely receiving lead wires therethrough for connection with the ballast, and a continuous sidewall extending outwardly from the base in surrounding relation with the ballast.

19. The method of claim 18 wherein the elastic shield includes an open end axially spaced from the base that tapers outwardly.

20. The method of claim 12 wherein the elastic shield providing step includes dimensioning the elastic protective shield to have an open first end diameter D1 and an open second end diameter D2 that is greater than D1.

* * * * *